United States Patent [19]

McConachie et al.

[11] Patent Number: 4,573,044
[45] Date of Patent: Feb. 25, 1986

[54] TWO CHANNEL LOOPED COMMUNICATION SYSTEM HAVING REROUTING AND FOLDED LOOP CAPABILITIES

[75] Inventors: Malcolm A. McConachie, Reading; John Rance, Newbury, both of England

[73] Assignee: Racal-Milgo Limited, Berkshire, England

[21] Appl. No.: 459,915

[22] Filed: Jan. 21, 1983

[30] Foreign Application Priority Data

Feb. 8, 1982 [GB] United Kingdom ................ 8203503

[51] Int. Cl.$^4$ ........................... H04Q 9/00; H04J 3/14
[52] U.S. Cl. ........................... 340/825.05; 340/825.01; 370/16
[58] Field of Search ................ 340/825.05, 825.01; 370/86, 87, 88, 16, 89

[56] References Cited

U.S. PATENT DOCUMENTS

| Re. 28,958 | 9/1976 | Zafiropulo et al. ............ 340/825.05 |
| 2,986,602 | 5/1961 | Tubinis . |
| 3,458,661 | 7/1969 | Forde et al. . |
| 3,519,750 | 7/1970 | Beresin et al. . |
| 4,002,847 | 1/1977 | Dail ........................................ 370/86 |
| 4,190,821 | 2/1980 | Woodward ........................... 370/88 |
| 4,354,267 | 10/1982 | Mori ................................ 340/825.01 |
| 4,370,744 | 1/1983 | Hirano et al. ......................... 370/88 |
| 4,380,061 | 4/1983 | Mori et al. ........................... 370/88 |
| 4,390,984 | 6/1983 | Sugiura et al. ....................... 370/88 |
| 4,446,551 | 5/1984 | Seo ....................................... 370/88 |
| 4,460,994 | 7/1984 | Scanlon et al. ....................... 370/89 |

FOREIGN PATENT DOCUMENTS

| 1229149 | 4/1971 | United Kingdom . |
| 1457058 | 12/1976 | United Kingdom . |
| 1481108 | 7/1977 | United Kingdom . |
| 1493899 | 11/1977 | United Kingdom . |
| 1510462 | 5/1978 | United Kingdom . |
| 1561498 | 2/1980 | United Kingdom . |

OTHER PUBLICATIONS

Patent Abstracts of Japan, "Unexamined Applications" Feb. 4, 1981, vol. 5, No. 19: No. 55-147852 (Denki), No. 55-147850 (Seisakusho) and No. 55-147851 (Seisakusho).
Wilks, M. V. "Communication Using a Digital Ring" Pacnet Conference, Sendai, Japan, Aug. 1975, pp. 47–55.
Zafiropulo, p. "Reliability-A key Element in Loop Systems", 1974 Int, Zurich Seminar on Digital Communications, IEEE.
"Computers-Network Distributes Command and Control", Electronics, Jul. 14, 1981.
*Press Report:* "How Viable Cambridge Ring in the Lan Circus?", Electronics Times No. 153 3/10 Dec. 1981, pp. 30–32.

*Primary Examiner*—Donald J. Yusko
*Attorney, Agent, or Firm*—Robert F. O'Connell

[57] ABSTRACT

A communication system has a first station (SO) and a plurality of further stations (S1–S4), two communication channels (A, B), for transmission in opposite directions, serially connecting the stations. The first station includes routing means operable in a double looped mode to route signals received on each channel onto the respective other channel and the further stations each including routing means operable in a through mode to forward, in the same channel, signals received on each channel, thereby forming a single folded transmission path. Preferably the further stations each are responsive to the cessation of signalling energy (e.g. a break in the transmission path) on a channel to assume a looped mode in which signals received in the other channel are rerouted onto that channel, with the first station responding by assuming a through mode in which signals received on each channel are forwarded in the same channel, again forming a single folded transmission path following rerouting at two of the further stations.

17 Claims, 19 Drawing Figures

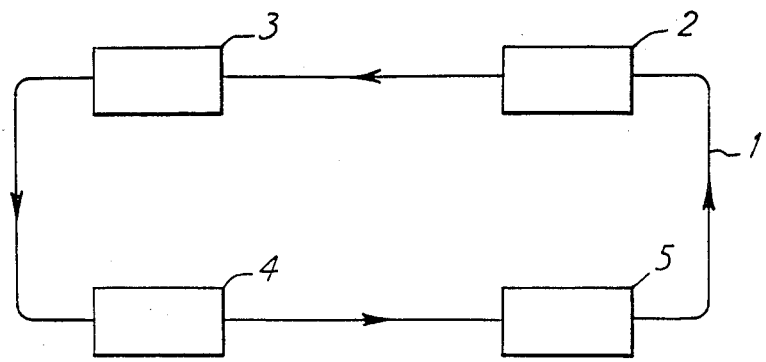
FIG. 1
| S | F | M | ADDRESSES | DATA | ACK/PARITY |
FIG. 2
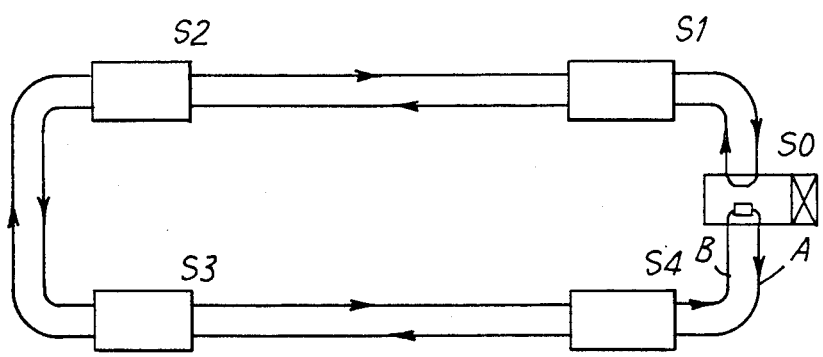
FIG. 3
| 1 | 1 | 1 | 4 | 8 | 8 | 16 | 2 | 1 |
|---|---|---|---|---|---|---|---|---|
| S | F | M | CONTROL | MAIN ADDRESS | SUB ADDRESS | DATA | ACK | P |
FIG. 4

TWO CHANNEL LOOPED COMMUNICATION SYSTEM HAVING REROUTING AND FOLDED LOOP CAPABILITIES

The present invention relates to communication systems, and more particularly to a system in which units communicate via a transmission path which is in the form of a ring. Although not limited to such situations, the system is particularly useful for communication over a limited area, e.g. within a building, as a so-called local area network.

The Cambridge Ring system, so-called because it was developed to support a local area network within the University of Cambridge computer laboratory, is illustrated in outline in FIG. 1. Essentially this has a circulating data path 1, linking stations 2, 3, 4, 5, etc., around which data packets continuously circulate—although at any time some of the packets may be empty in the sense that they contain no data information. Apart from the provision of a source of clock pulses, the system theoretically has distributed control at the lowest level; in practice, however, one station will serve as a monitor station to set up the packet structure on initialisation, to clear corrupt packets, and exercise other administrative functions.

The packet format is shown in FIG. 2. It commences with a start or framing, bit S; the data format is not in principle critical and either synchronous or asynchronous transmission can be employed. The start bit is followed by a full bit F, monitor bit M, control, address and data fields, and acknowledgement and parity bits. Circulation of the packets round the ring is continuous, the ring length (i.e. data path delay and delays in the stations A, B, C, etc.) being such as to support a whole number of packets plus a small gap, of, say, 4 bits in length. Initially, the packets circulating around the ring are "empty", containing no information, in which case the full bit F is clear (logic zero). Consequently, subject to restrictions mentioned below, any station can seize a free packet and enter into it any information, whether control or data, for transmission to any other station on the ring. A station wishing to make a transmission inspects the full bit of each packet, and upon finding a packet with the full bit clear, inserts into the empty packet the address of the destination and the data to be transmitted, and sets the full bit. Each station, unless otherwise engaged, inspects all full packets to ascertain whether the address fields correspond to one or more addresses allocated to that station, and if a match is found, the station reads the data, and sets an appropriate bit in the acknowledgement field. The packet in question continues round the ring, and it is the originating station's responsibility to free that packet for further use by clearing the full bit. The originating station possess information as to the length of the ring, so that, by counting packets, it can recognise this packet simply on the basis of the time at which it returns: the originating station clears the full bit, and reads the acknowledgement bits to establish whether the signal reached its destination.

According to the present invention there is provided a communication system comprising a first station and a plurality of further stations, two communication channels, for transmission in opposite directions, serially connecting the stations, the first station including routing means operable in a double looped mode to route signals received on each channel onto the respective other channel and the further stations each including routing means operable in a through mode to forward, in the same channel, signals received on each channel, whereby a single folded transmission path is formed.

In another aspect the invention provides a communication system comprising a first station and a plurality of further stations, two communications channels, for transmission in opposite directions, serially connecting the channels, each station including routing means operable in a through mode to forward in the same channel, signals received on each channel, thereby forming two continuous loops, and each station being arranged, in operation for communication with a respective one of the two channels, and link means operable to transfer messages between loops when required, each station further including means for monitoring the presence of signalling energy in each channel, the routing means therein being response to the cessation of such signalling energy on a channel to assume a looped mode in which signals received in the other channel are rerouted onto that channel, whereby a single folded transmission path is formed following the said rerouting occurring at two of the stations.

Some embodiments of the invention will now be described with reference to the accompanying drawings, in which:

FIGS. 1 and 2 represent the Cambridge Ring system and packet format.

FIG. 3 is a block diagram of a communication system according to the present invention;

FIG. 4 shows the data format;

The communications system is a development of the Cambridge ring described above, but, as shown in FIG. 3, has a data path consisting of two communication channels A, B operating in opposite directions and each passing through each of a number of stations S0, S1, S2, S3, S4: although in practice there would usually be more than five stations. At station S0, two channels are, during normal operation, looped back on both sides to form a single, continuous folded ring. Each station can act as an interface to a source and/or destination of information, such as a high-speed data terminal or source, teletypes, telephone points, facsimile apparatus, slow-scan television apparatus, public address units, fire alarm systems, or the like, or other ring. Station S0 is designated as administrator and performs certain central functions including initial setting up of data packets on the ring. The packet format is illustrated in FIG. 4 and is in principle the same as that shown in FIG. 2 although in this example there are a number of differences, referred to in more detail below. As in the Cambridge ring, the data packets circulate continuously around the ring with a small gap of, e.g., 4 bit periods in length: the administrator S0 contains buffering to adjust the total ring length accordingly.

Figure 5:
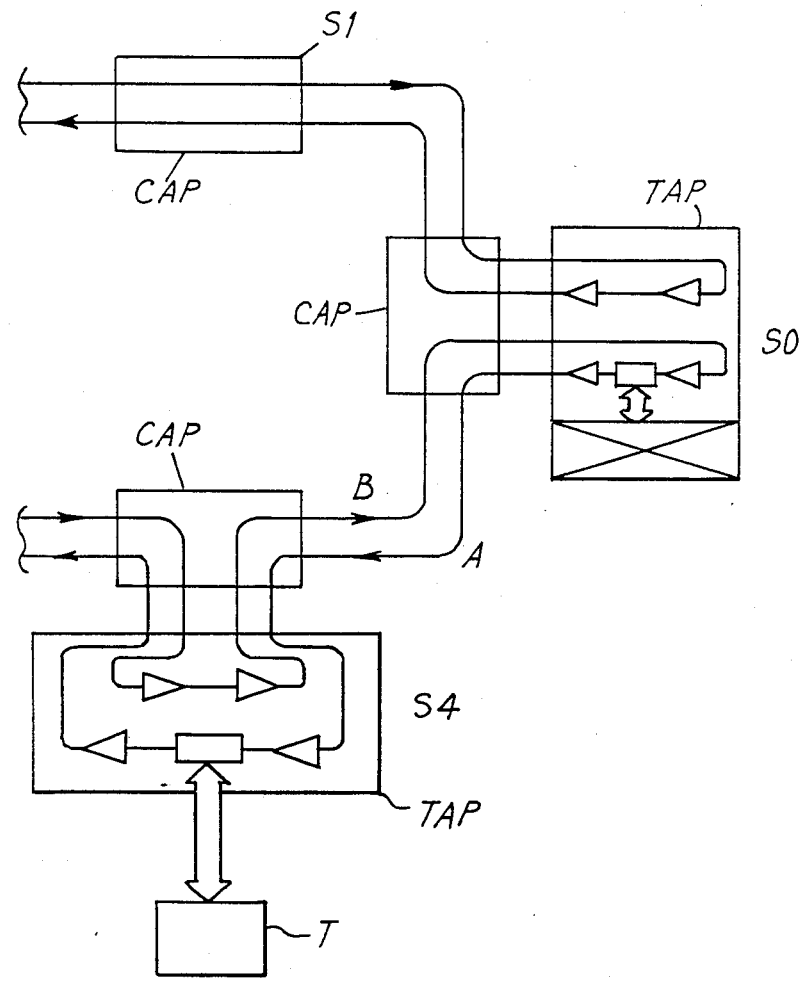
FIG. 5 is a block diagram of part of the system of FIG. 1 showing the division of the stations into terminal—and cable—access points.

For flexibility in structuring the system (although this is not crucial to its operation) each station comprises a cable access point CAP which may be in by-pass mode (i.e. effecting a straight-through connection) or have a terminal access point TAP connected to it to interface to a data source or destination T, as illustrated for stations S1, S4 respectively in FIG. 5. In this way the system can be reconfigured by plugging and unplugging TAPs from CAPs as desired. As shown, the CAP is simply in entry point at which a TAP can be interposed in the channels A,B, the control and data transmission apparatus being contained in the TAP.

Despite the above reference to "cable", the data path may be formed by any convenient medium, such as coaxial cable, twisted pair(s), fibre optic lines, radio links, or combinations of these.

Figure 6:
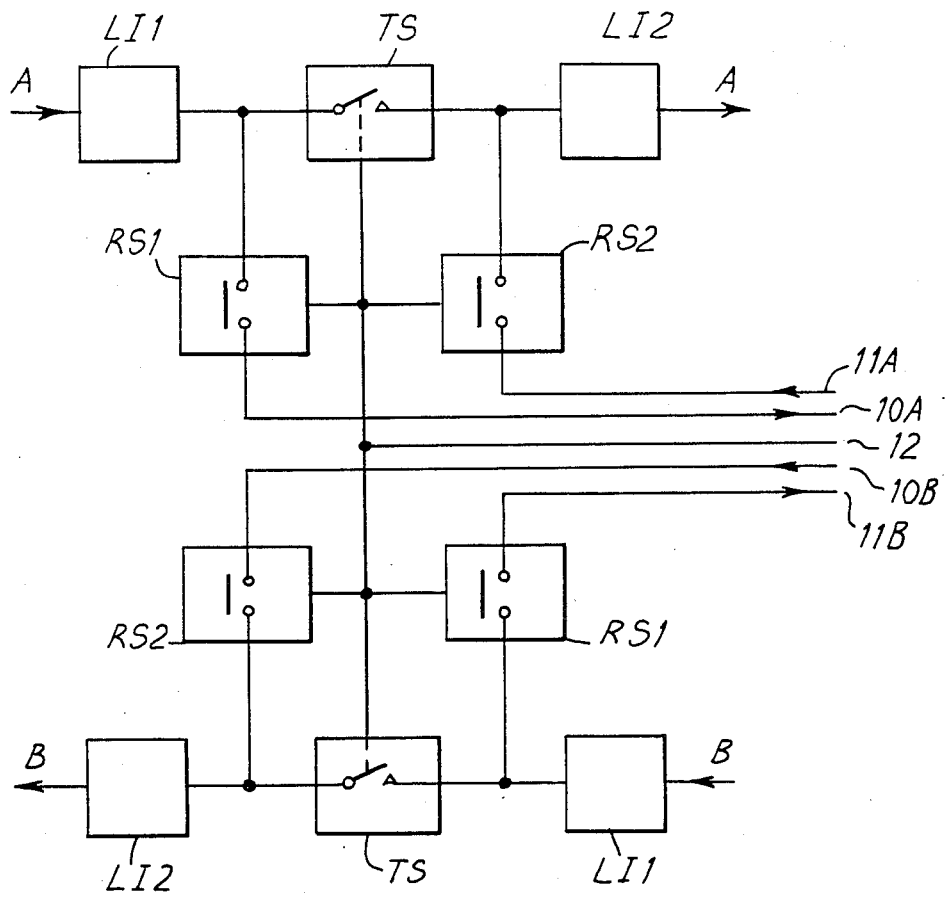
FIG. 6 is a block diagram of a cable access point.

FIG. 6 is a block diagram of a cable access point, which comprises, for each of the two channels A,B, an input and output line isolator LI1, LI2 for connection to, for example, coaxial cables. A T-mode switch TS in each channel can be controlled to connect the input and output line isolators so that the access point is essentially transparent to the signals on the two channels (apart from delays inherent in the circuitry), or to break the path between the isolators, whereupon R-mode switches RS1, RS2 can be closed to route the signal path via lines 10A, 10B, 11A, 11B to and from the TAP. A mode control signal for the switches (which may conveniently be field efect transistors) is obtained from the TAP via a control line 12; the arrangement being such that, if a TAP is not connected, or suffers power failure, the "straight-through" mode is assumed.

Each TAP has (FIG. 5) repeaters in each channel, and regeneration in only one channel. The TAP operates in series with the regenerated channel, (A for station S4 in FIG. 5) but monitors the other channel. The system will usually be configured so that the two channels A,B are regenerated alternately at successive TAPs—which preferably include switching means (described below) whereby this situation can be preserved upon system reconfiguration.

The regenerated channel has a small delay(e.g. 2 or 3 bits) so that the formatted packets of binary data passing round the ring can be read and/or changed by the TAPs. As will be described below, each TAP includes switching arrangements whereby the data paths in the two directions may pass through the TAPs or the two channels may be looped back on either or both sides of the TAP. However, in normal operation, connections are maintained as in FIGS. 3 and 5, data being transmitted via the circulating data slots. As the station only has a 2-bit "window" on the data, this places a restriction on the operations which can be carried out by a station, since it cannot change the value of earlier bits in response to information contained in later bits. In order to minimise time problems, it is provided, for example, that a station wishing to transmit will set the full bit of the first and, if necessary, each succeeding, packet before checking whether the full bit was already set.

Referring again to the packet structure shown in FIG. 4, the address field contains an address specifying the station to which the message is addressed. In this situation the destination address field of the data packet may comprise for example an 8-bit TAP address and an 8-bit port address. The system as described does not include in the data packet a source address indicating where the information originated (although this is usual in conventional systems). This is unnecessary since each TAP, as mentioned before, "knows" the ring length, and can therefore recognise those packets containing its own messages without the necessity for a source address. The receiving station does not need to know the source address by virtue of a higher level supervisory function excercised by the administrator whereby no transmission takes place until a call is established via the administrator: the originating station informs the administrator of an intention to transmit data to a specified address, and the administrator acknowledges that this is possible (i.e. that no other stations are at present attempting to communicate with the port associated with that address) and informs the destination TAP accordingly. The administrator then denies other TAPs permission to transmit to that destination until the transmission has ended.

It was mentioned above that each station may respond to more than one address, and in this way it is possible to transmit a data packet which will be read by more than one station, by allocating not only individual addresses to each station, but also "broadcast" addresses, to all or selected groups of stations.

The system will usually include anti-hogging measures to ensure a degree of system availability to each station. For example it may be provided that each station shall be precluded from immediately reusing a packet on which it has previously transmitted. In general, when an originating station re-receives one of its own data packets, it has the option of clearing the full bit or reusing the packet: however, with such an anti-hogging algorithm in force the station is obliged to clear the full bit, thus freeing the packet for use by other stations. In order to prevent the indefinite propagation of "full" data packets in situations where the originating station has developed a fault before it has had the opportunity to clear the full bit, the packet includes a monitor bit M, and the administrator sets the monitor bit of each full packet which arrives: if the monitor bit is already set, the administrator recognises this as indicating that the packet in question has circulated the entire ring more than once as a full packet, and therefore clears the full bit.

It may be noted that, with the anti-hogging algorithm referred to above, the system is deterministic in that the behaviour of the system under load is predictable and in particular the data transmission capability over any particular path is known in advance. Consequently it is possible to construct a transparent system.

The control bits may serve various functions, for example one or more of the following:

1. to signal the address field as comprising 8 1-bit addresses for conference addressing.

2. to indicate, where 8-bit bytes are being transmitted in pairs in a 16-bit data field, that the second byte is invalid (due for example to a slow data rate or to the data containing an odd number of bytes).

3. end of message.

4. interpret data field as control.

5. flag administrator as source, or data field defined as source address when the destination is the administrator.

The acknowledgement bits referred to above may carry the following information—ignored: the receiving TAP has ignored the data packet destined for it, and has not set the acknowledgement bits. This may indicate a fault or that the TAP in question has been removed from the system. Generally the originating TAP will respond by repeating the message (for example, three times) before abandoning the attempt. Secondly an acknowledgement bit may be set to indicate that the message has been accepted by the addressed TAP. Thirdly, the destination TAP may set acknowledgement bits appropriately to indicate a "busy" condition which means that the TAP is unable to receive the message for the present, for example because its data buffer is full. A TAP may have several data ports, and thus the busy acknowledgement may indicate "TAP busy" or "port busy". It will of course be appreciated that transmission in this way requires the existence of a continuous transmission path.

Normal operation of the system having been described, its response to faults—e.g. a break in one or both channels, or a fault at a station, causing interruption of the loop—and the initial configuration or reconfiguration prodedures will now be considered. For this purpose it is necessary to describe further the switching arrangements within the TAP.

Figure 7:
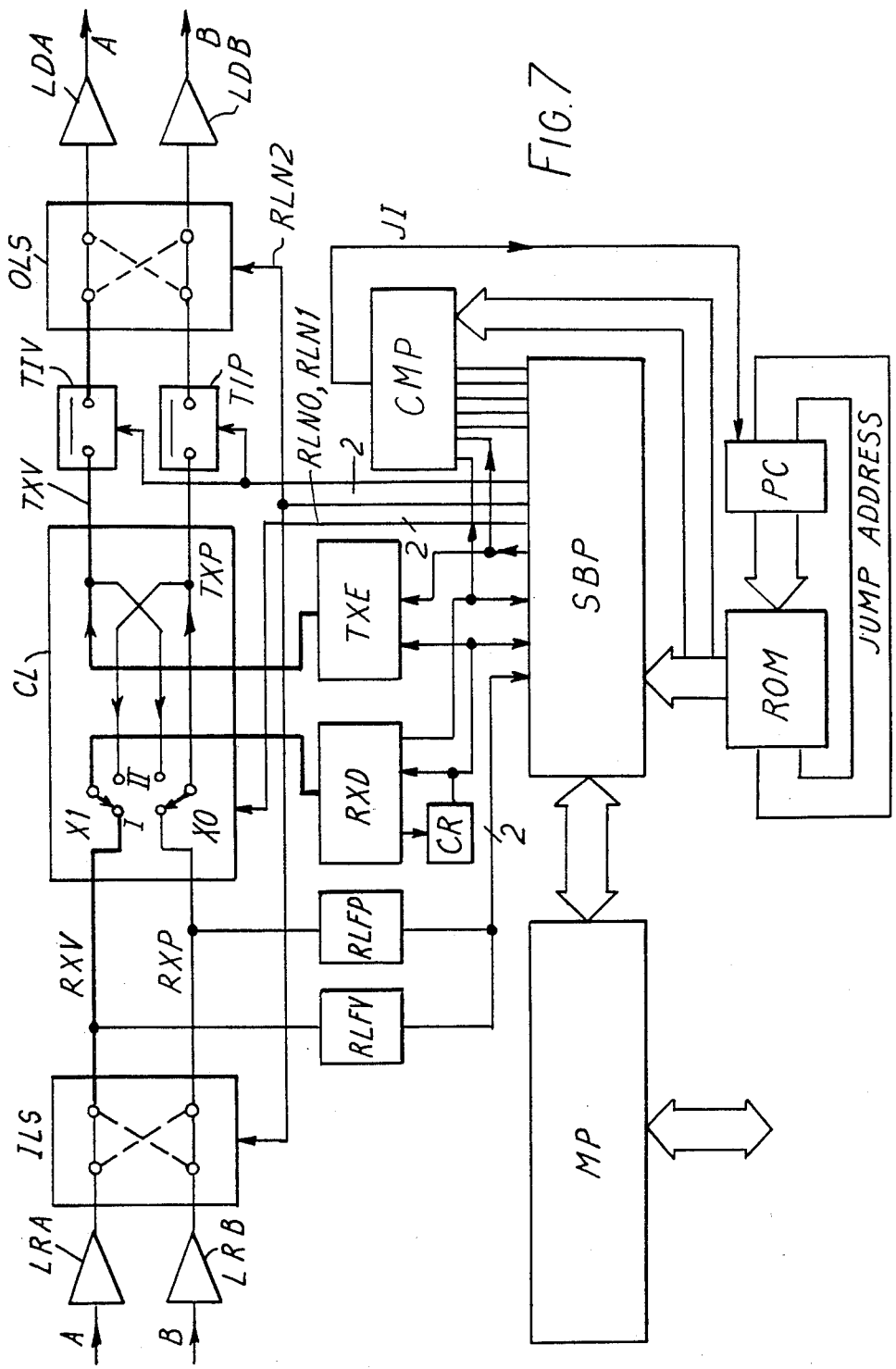
FIG. 7 is a block diagram of a terminal access point.

Referring to FIG. 7, the incoming channels A,B from the CAP (FIG. 5) are conducted via line receivers LRA, LRB to an input line switch ILS, which is an electronic switch actuable by a reconfiguration control signal RLN2 from a serial bit-processor SBP to connect A and B either to active and passive receive lines RXV, RXP or vice versa. Similarly, active and passive transmit lines TXV, TXP are connected via an output line switch OLS, also controlled by RCN2, and line drivers LDA, LRB, to output channels A,B. These line switches interpose the TAP signalling and regeneration circuitry in either channel A or channel B as mentioned above. Receive line failure circuits RLFV, RLFP monitor the active and passive receive lines and indicate to the serial bit processor SBP the absence of received signal, whilst transmit inhibit switches TIV, TIP, controlled by the processor SBP, serve to inhibit transmission.

The active and passive lines are connected to configuration logic CL which is in turn connected to a transmit encoder TXE, receive decoder RXD and a clock recovery circuit CR. In this example, the signals are encoded in differential Manchester code, although other types of encoding or modulation are possible. The configuration logic is basically a pair of changeover switches X0, X1 controlled via control lines RCN0, RCN1. In normal operation (both switches in position I) switch X0 routes the passive receive line RXP to the passive transmit line so that signals on whichever channel is determined (by switches ILS, OLS) as passive, are routed straight through, whilst switch X1 routes the active receive and transmit lines RXV, RXP to the encoder RXE and decoder TXD respectively. This situation can be more clearly visualised from the schematic diagram of FIG. 8a. The decoded signals are monitored, regenerated, and if necessary (i.e. when data is to be transmitted) altered by the serial bit processor.

Figure 8:
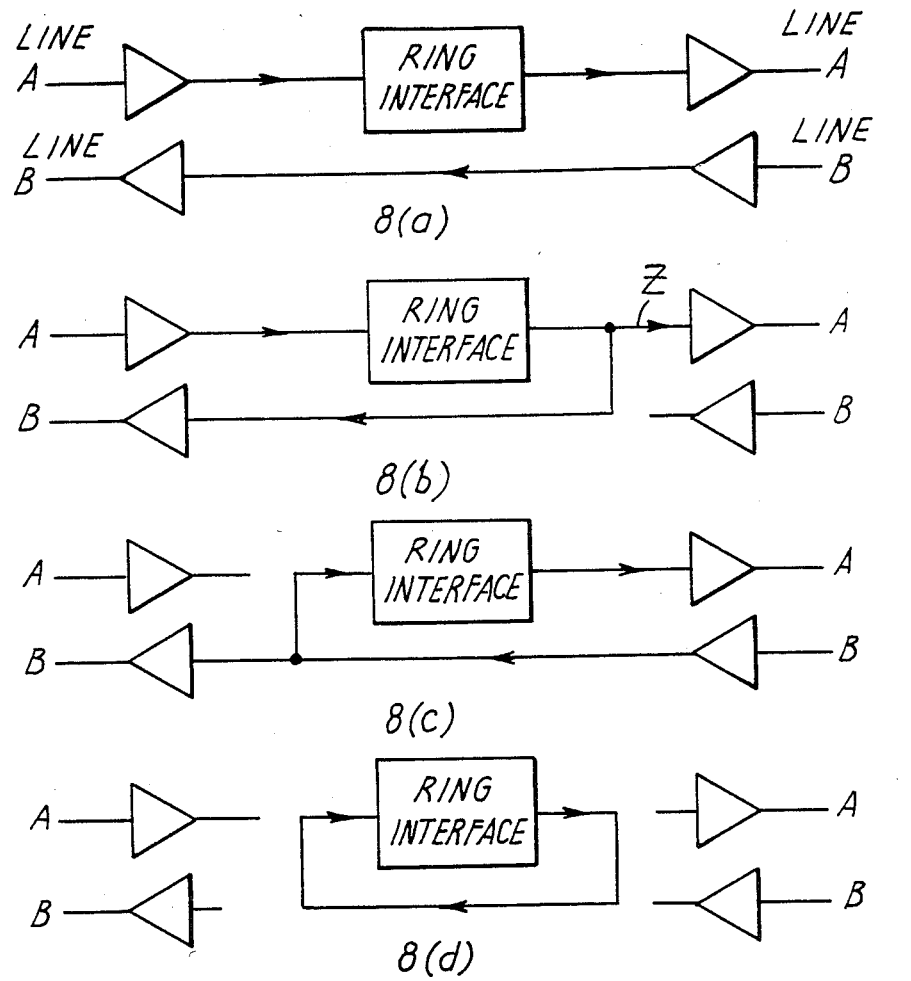
FIGS. 8a to 8f illustrate various switching configurations with the terminal access point of FIG. 7.
Figure 8:
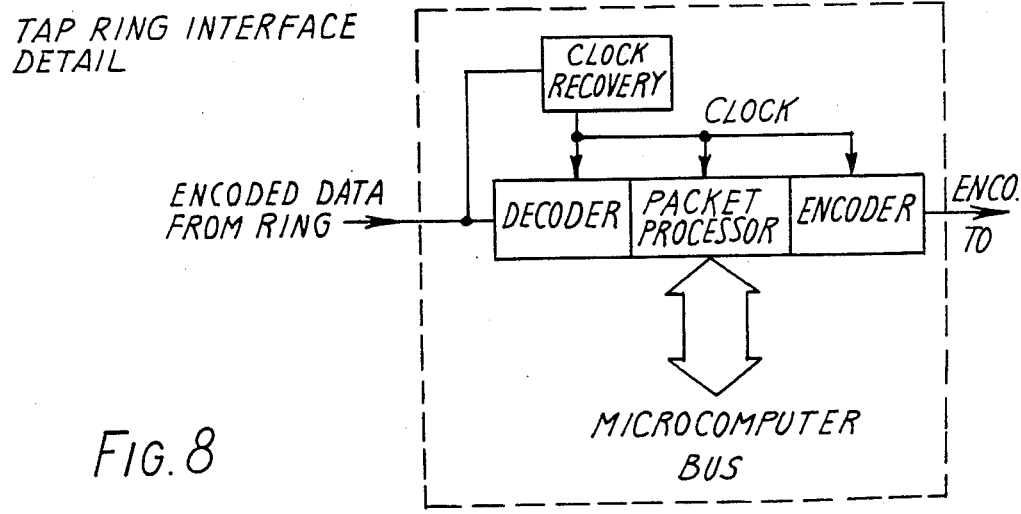
Figure 8:
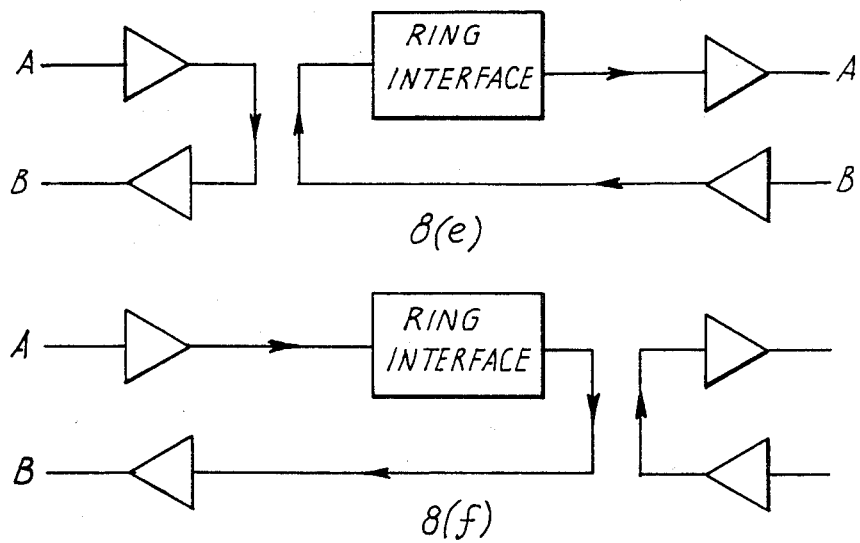

Either of the switches X0, X1 may be switched to position II ("loop-back mode") to loop one channel back to the other, whilst still passing through the encoding/decoding circuitry, as illustrated in FIGS. 8b (switch X0 in position II) where signals received on the active channel assumed to be channel A—are re-transmitted (possibly with modification, if data transmission is taking place) on channel B. Transmission on channel A is still shown (at Z), but can be inhibited by operation of the relevant transmit inhibit switch TIV or TIP. FIG. 8c shows the situation with switch X1 in position II. Operation of both switches results in an "island mode" (FIG. 8d). Obviously, operation of the line switches ILS, OLS causes the configuration shown in FIGS. 8a–8d, but with the roles of channels A and B reversed.

The serial bit processor has associated with it a microcode program memory ROM, program counter PC, and a comparator CMP which compares received and transmitted data bit by bit with selected data from the processor SBP, a match resulting in a program jump via jump/increment line JI to the program counter PC. In this way, the processor SBP can recognise and, if necessary, change before retransmission, the various fields of the received packets. It also responds to signals from the receive line failure circuits RLFV, RLFP, and controls the transmit inhibit circuits TIV, TIP, as described below. The use of a serial processor for essential real-time operations on the data packets passing round the ring permits the use of high data rates: further control functions are performed by a microprocessor MP which also includes interfaces for external connection. The administrator S0 includes a TAP identical to that shown except that it contains a variable length buffer (not shown) for adjusting the effective ring length, that the clock recovery circuit is supplemented by a master oscillator, that the configuration logic is capable of assuming a mode (FIGS. 8e, 8f) in which the two channels are looped together on both sides (although in practice for convenience of manufacture the other TAPs will have this facility but not use it), and the microprocessor MP may be more powerful.

Figure 9:
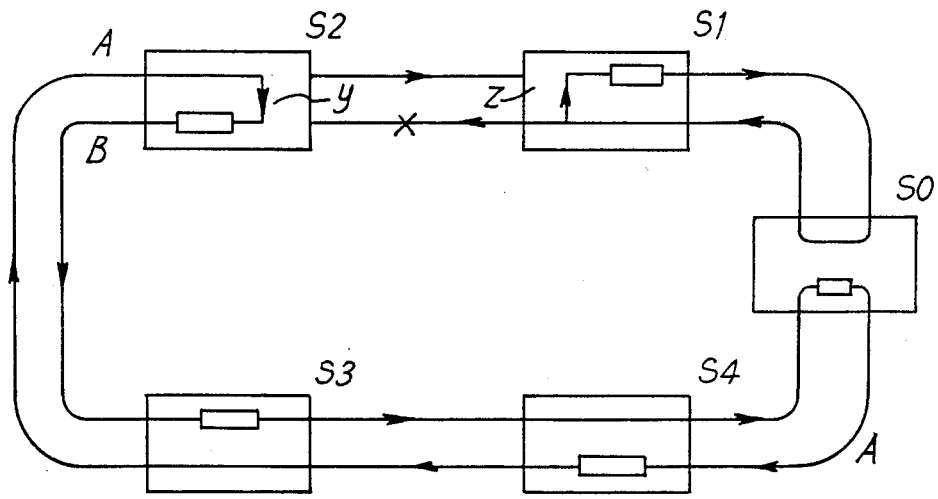
FIGS. 9 and 10 are block diagrams similar to FIG. 3 illustrating response to a cable break.
Figure 10:
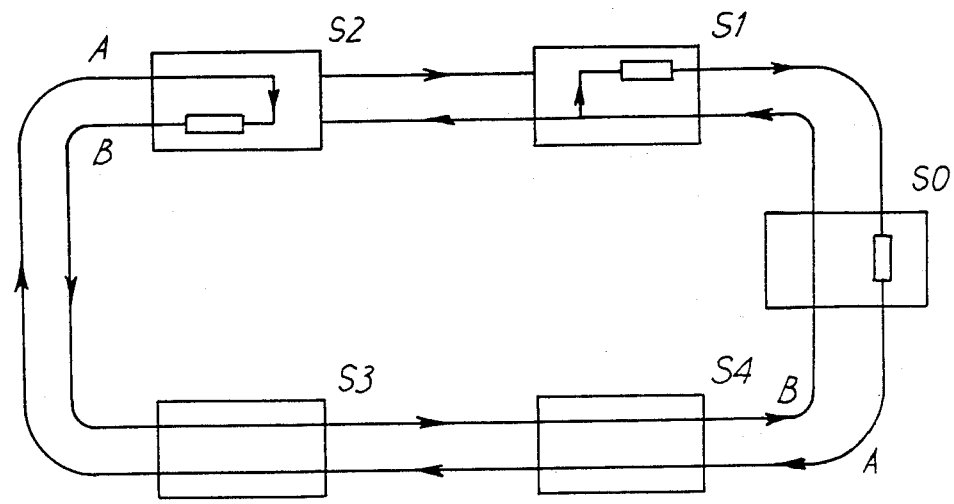

As mentioned above, each TAP has receive line failure detectors RLFV, RLFP which monitor the incoming lines for the presence of signal which could be carrier (in the case of a modulated system): in this example, where there is no carrier, and since in some circumstances (during initialisation, for example) it may be expedient to transmit null data (i.e. voltage transitions at clock rate), the detectors monitor for the presence of such transitions. For convenience this will be referred to as "carrier". Consider now a situation in which a cable break occurs at X in channel B between stations S1 and S2 (FIG. 9). It is assumed that, in station S1, B is the passive channel and therefore detector RLFP recognises failure of received signal; if this persists for a predetermined period of time (e.g., for a 10 MHz clock rate, 4 $\mu$s) it signals this fact to the processor SBP which responds by actuating the configuration logic CL to change switch X0 to position II, thus looping the two channels together in the manner indicated in FIG. 8b. This is shown schematically in FIG. 9 as loop y. If there is a break in both channels, station S1 will also react autonomously in like manner, looping as at z. The interruption of the flow of data packets is recognised by the administrator S0, which proceeds to restore operation initially on half the broken ring as indicated by the heavy lines in FIG. 9. It adjusts its buffer delay to restore the overall ring delay to that corresponding to an integral number of data packets plus gap and restores normal operation by communicating to the TAPs by transmission of appropriate control data that the integrity of the ring has been restored, and informing the TAPs as to the new ring length. The administrator, which, it will be recalled, normally operates in a looped back mode so as to give a single ring, then switches its TAP to the "through" configuration (FIG. 8a) to include the other limb of the ring (FIG. 10), and again adjusts its buffer delay to restore operation.

The manner in which the system has been reconfigured at S1 and S2 is communicated to the administrator by the associated TAPs by transmission of data packets indicating the looping back operation which has taken place.

If the break at X in channel B is not accompanied by a corresponding break in channel A, the looping-back of station S1 is effected in response to operation of the relevant transmit inhibit switch (here, TIV) to cease transmission on, in this instance, line A, so that station S1 responds to carrier failure just as if a cable break had occurred.

It can be provided that this transmit inhibit can be carried out by the TAP autonomously, simultaneously with looping at y, or by the TAP under instruction from the administrator once the half-loop shown in solid lines in FIG. 9 has been restored. The latter alternative is preferred since the nature of the break is then recorded. If transmission failure is due to a defective TAP or CAP rather than a cable break as suggested above, a similar action will occur in that the TAPs on each side of the defective one will "snap back" in a similar manner to that described above. Communication from the "looped-back" stations to the administrator will indicate the current extent of the ring.

It will be appreciated that the occurrence of faults of this nature will cause corruption and loss of data on the ring; however, a TAP which has originated data will, in these circumstances, not receive the return packet with the acknowledgement bit(s) set, and will therefore be able to retransmit.

Figure 11:
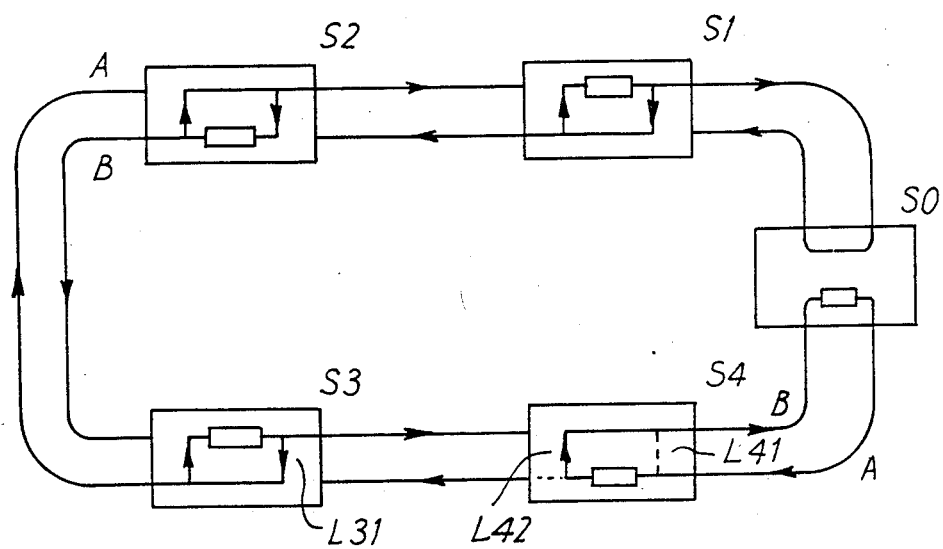
FIG. 11 is a block diagram similar to FIG. 3 illustrating the first state in initial formation of the transmission path.

Having described normal operation and response to certain fault conditions, the initial configuration procedure of the system will now be described. On initial start up, each TAP begins in island mode as shown in FIG. 8d (both switches in position II in FIG. 7), so that each TAP is capable of monitoring its incoming signal lines, but is not capable of transmission. At this point, the double loop-back serves no purpose as far as the ring is concerned, although it may incidentally be of use in self-test procedures carried out by the TAPs. Initially, then, the administrator carries out a self-test and then begins transmitting carrier on, say, channel A. The TAP at S4 responds by opening the loop L41 so that a small ring (FIG. 11) is then set up via the loop L42. Upon receiving return carrier via channel B the administrator transmits packets around the ring to establish the ring length, sets its delay and informs the TAP as to the packet count to establish communication on this ring. It then interrogates station S4 for identity and status information and the TAP responds by forwarding this information via the ring, as described above. The administrator S0 then instructs the TAP at S4 to rmeove its transmit inhibit and open its second loop L42 to enter the straight-through mode (FIG. 8a) and the administrator is then in a position to proceed in a similar manner to establish an extended loop including station S3. If however, station S4, upon enabling its transmitter, does not receive return carrier from S3 on channel B within a predetermined period (e.g. 250 $\mu$s), it either re-closes the loop L42 (if already open) or refrains from opening the loop and the ring-building process ceases.

It may be noted that this time constant is longer than that effective for fault recognition during normal operation, the processor SBP within the relevant TAP adjusting its response to the signal from the receive line failure detector (RLFV or P) accordingly.

Similarly, if within a (longer) predetermined period S4 does not receive from the administrator confirmation of a stable transmission path including S0, S4 and S3, it again closes the loop L42.

Assuming that loop L42 is opened, then carrier from station S3 is returned to the administrator S0 via station S4, and the administrator establishes communication around an enlarged loop containing S0, S3 and S4.

Figure 12:
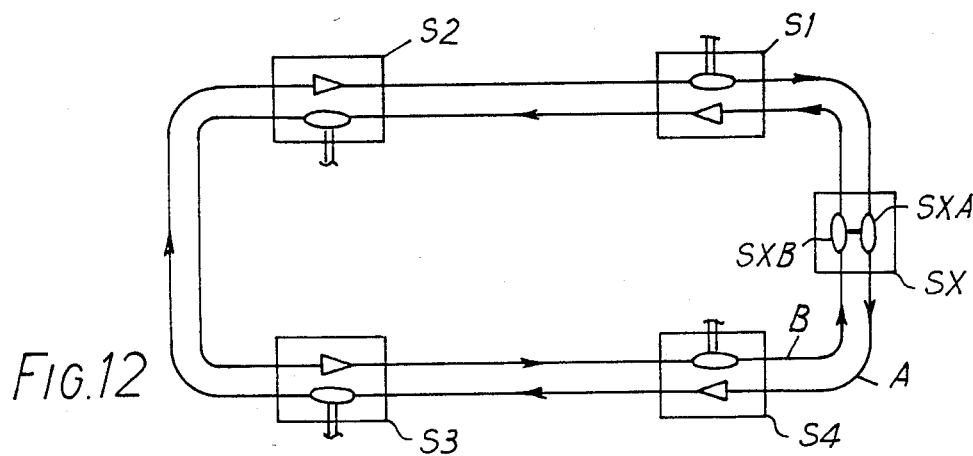
FIGS. 12 and 13 are block diagrams similar to FIG. 3, showing alternative embodiments of the invention.

The process continues round the ring until a complete ring has then been up, and the administrator has built up a directory of the TAPs which are on the ring and their status and addresses. The complete ring having been set up, the administrator finally adjusts its buffering delay accordingly and sends control messages to all the TAPs to initiate normal operation, at the same time informing the TAPs of the overall ring length. Although as described, this process takes place clockwise round the ring, if desired this building-up process can be carried out in both directions simultaneously—e.g., as shown in FIG. 12 the administrator interrogates S4, S1 etc. alternately.

The procedures described above have been discussed in the context of failure and initial setting up. However, the looping of individual TAPs may be commanded by the administrator, for example for test purposes or to free sections of the system for maintenance or extension purposes. Similarly, the system may be commanded to revert to the start-up, looped mode for a "rebuilding" of the system in the manner described. This may be carried out, again for maintenance purposes or for reconfiguration of the TAPs, or if the administrator recognises a situation in which intermittent faults are occurring.

The administrator may also be arrranged to send periodic test messages to locate faults and bypass the faulty element.

It will be appreciated that the functions of the administrator in relation to linking the two channels A, B and fault and (re-)configuration functions on the one hand and its function in recording the status of the ring and the identity of the stations on it are not inseparable, and could if desired be handled by different stations. If desired one or more further (standby) administrators could be included, these operating as normal stations until required—for example due to a fault in the main administrator or the ring section containing it. Indeed, all the stations could be provided with the capability of acting as administrator.

In the event of an administrator fault during normal operation, the standby administrators would recognise signal failure and hence the presence of a break in the transmission path. If operation were not restored within a set time by the originally active administrator, a standby station would assume the role of administrator. Administrator priorities can be determined by providing for different waiting times. Similarly, where in the event of cable or TAP failure at two points communication has been re-established on only part of the ring, a standby administrator may be able to establish communication (albeit independent) on the remaining part of the ring.

Should the situation arise in which initial ring-building is attempted by two or more administrators simultaneously, the build-up procedure will proceed as usual until the two meet. When the administrators generate data packets in order to establish the packet count, conflict will be recognised by a station receiving carrier which it has not sent out, or the administrator receiving returned carrier with packets out of synchronisation; if necessary the administrator can recognise alien packets by virtue of identifiers included in the packets. All administrators then wait, for respective different times, the system reverting to its "island" state; the highest priority one (i.e. with the shortest waiting time) then recommences the building procedure.

It was mentioned earlier that looping-back of TAPs may be commanded by the administrator to isolate a cable section in event of intermittent faults–e.g. corruption of data packets due to electrical interference or the like. Such phenomena may be of a relatively transient nature and provision may be for automatic polling of the "dead" section to provide a rapid recovery to the normal operating configuration once the fault has cleared. For this purpose, the administrator instructs the TAP on one side of the section to transmit over that section: for example in station S2 in FIG. 9, which is in the state shown in FIG. 8(c), transmit inhibit switch TIP is enabled to cause transmission on channel B. If this "test" transmission is successful, station S1 will report receipt to the administrator. A similar test is then carried out in the opposite direction, i.e. from S1 to S2, and if this is also successful, the administrator reconfigures the loop to include the missing section. Otherwise the test is repeated at intervals.

If the "dead" section contains one or more stations, the above procedure must be preceded by extension of the loop to include the remaining stations. This is similar to the initial ring-building procedure described earlier but it would of course be provided that (e.g. for extending to S3 in FIG. 11) station S4 would not be instructed to remove the loop L42 until the integrity of the path S4-S3-S4 had been verified, to avoid unnecessarily interrupting communication.

FIG. 12 shows a communications system of modified form. Like that shown in FIG. 3, it has two communication channels A, B operating in opposite directions: as before, the stations S1, S2, S3, S4 operate (i.e. transmit and receive) on alternate channels, (indicated by a circular symbol) and each has a repeater (triangular symbol) in the other channel. The stations S1 to S4 are identical to the stations used in the arrangement described above. However, in normal operation, unlike the situation depicted in FIG. 3 where the two channels were looped back on both sides at station S0 to form a continuous, folded ring, here the two channels pass through station SX so that each forms its own continuous separate ring.

Communication between stations on a given channel (e.g. stations S1, S3 on channel A, takes place in the manner described above: channel B is not involved, so that communication between stations S2, S4 on channel B can take place concurrently. Communications between stations on different channels (e.g. S1 and 2) takes place via an interchange station SX which effectively consists of two interlinked stations SXA, SXB. Messages from (say) S1 to S2 are transmitted from S1 and received by SXA in the normal way and forwarded to SXB where they are retransmitted, on channel B, to S2.

Figure 13:
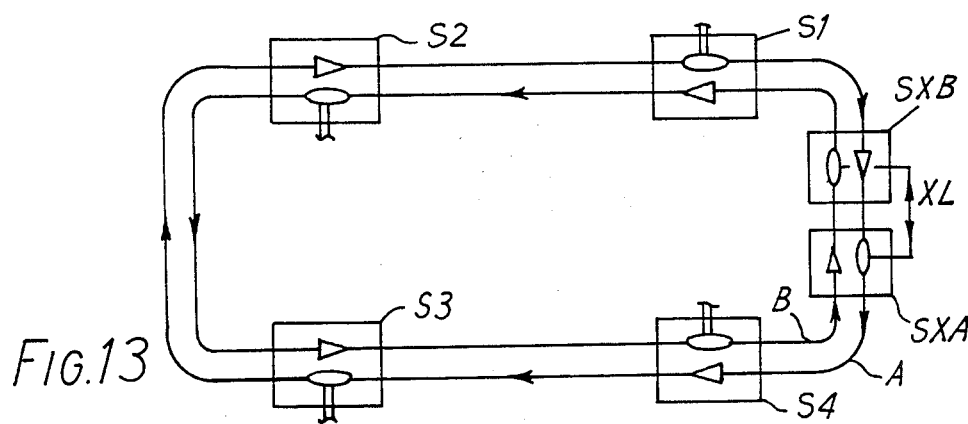

In this situation, the two stations SX could consist of two separate co-sited stations physically identical to the other stations, with a link XL, as illustrated in FIG. 13.

For a given bit-rate, the two-ring arrangement has an average data-carrying capacity greater than that of FIG. 3.

It should be noted that each channel will require its own administrator, which can be located at any of the of the stations on the relevant channel (plus any additional, standby administrators).

Figure 14:
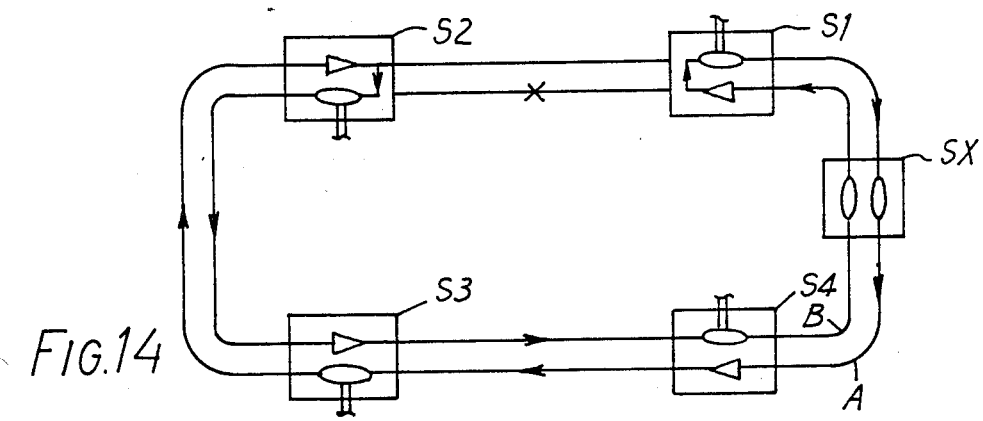
FIG. 14 is a diagram illustrating the response of the system of FIG. 12 to a cable break.

As so far described, the system of FIG. 12 consists(ignoring repeaters and passive channel monitoring) of two separate, single rings with cross-communication provided by a link between a designated station on each ring. It differs from a conventional arrangement where intercommunication facilities are provided between two single rings in that each channel also passes through the stations which are operating on the other channel, and each station monitors this other channel, as in the case of FIG. 3, so that in the case of a fault, the system can assume the folded ring configuration, in the manner described above. Thus, stations S1, S2 respond to a break X in line B by looping back at x and y (FIG. 9). Station SX then responds to carrier failure abandons its interchange station status—resulting in the situation depicted in FIG. 14.

The system having become a single ring, only one administrator will be necessary and the other(s) must therefore assume standby status. Provision for arbitration between two or more administrators have already been discussed above. If one is to serve as standby in the looped, single ring state, the two should be located at separate positions of the ring (in particular the two should not both be located at station SX). In this condition, it is not necessary to have two stations at SX, and one may disengage itself from the ring, resulting in a configuration identical to that of FIG. 10.

It may further be noted that the system described above with reference to FIGS. 12 to 14 represents a substantial improvement over known systems in which two discrete rings operating in opposite directions are provided, where one ring acts only as a standby. By utilising both channels for communication during normal (i.e. no fault) operation, the above-mentioned improvement in data traffic capacity can be obtained.

We claim:

1. A communication system comprising a first station and a plurality of further stations, two communication channel, for transmission in opposite directions, serially connecting the stations, the first station including first routing means selectively operable in a non-fault mode and a fault mode, the non-fault mode being a double looped mode in which the first routing means route signals received on each channel onto the respective other channel and the fault mode being a through mode in which the first routine means forward, in the same channel, signals received on each channel, each further stations including second routing means selectively operable in a non-fault mode and a fault mode, the non-fault mode being a through mode in which the second routing means forward, in the same channel, signals received on each channel, the fault mode being a looped mode in which signals received on one channel are routed on to the other channel, the communication system normally operating with all stations in their non-fault modes, whereby a single folded transmission path is formed, each further station including means for monitoring the presence of signalling energy in each channel, the routing means therein being responsive to the cessation of such signalling energy on one of the channels to assume a looped fault mode in which signals received in the other channel are re-routed on to the said one channel, and the first station including means for recognising the interruption of signals, the routing means therein being responsive to such interruption to assume a through fault mode in which signals received on each channel are forwarded in the same channel, whereby a single folded transmission path is re-formed following the said re-routing occurring at two of the further stations.

2. A communication system according to claim 1, in which the first station is arranged in response to said interruption of signals firstly to establish communication around a partial folded transmission path extending between the first station and one further station which has assumed a fault mode, before the first station assumes a through fault mode to include the other further station which has assumed a fault mode.

3. A communication system according to claim 1, in which each further station in arranged, when assuming looped fault mode in response to cessation of signalling energy, to suppress forward transmission of the signals on the said other line.

4. A communication system according to claim 1, in which the first station is operable, upon recognition of faulty transmission over a section of the system without the cessation of signalling energy, or when so instructed, to cause the routing means of the station or stations adjacent that section to assume the said looped fault mode and, if the first station is not adjacent that section, to cause its own routing means to assume a through fault mode such that a single folded transmission path is formed excluding that section.

5. A communication system according to claim 1, in which the first station is arranged, in the event of a folded transmission path being formed excluding a section of the communication channels, to intermittently carry out a test procedure comprising transmission over that section form each one in turn of the two stations adjacent thereto and detecting whether reception of such transmission occurs at the other adjacent station, and, if fault-free reception occurs in both directions, to reinstate the excluded section.

6. A communication system according to claim 1, in which the system is arranged on power-up or when so instructed to assume a state in which each further station is in a looped mode in which, at least on that side of the station opposite to that on which signals are to be initially received from the first station, signals received on a channel are rerouted onto the other channel, and the first station is operable to carry out a transmission path building procedure in which the first station transmits signals on one channel and, upon recipt of returned signal from a first one of the further stations via the other channel transmits a command to the said first one of the further stations to cause its routing means to assume its through non-fault mode, and this process is repeated to establish a transmission path including progressively more stations.

7. A communication system according to claim 6, in which each further station is arranged, in the event that, during the said path building procedure, it does not receive, within a predetermined time, a signal returned from the next further station, to resume its looped mode, or to refrain from assuming its through mode and to communicate this fact to the first station, and the first station is arranged in response to such information from any station other than the station immediately adjacent thereto and other than the station to which transmission was first made, to cause its routing means to assume its through fault mode in which signals received on each channel are forwarded in the same channel, and if necessary to contine the path building procedure.

8. A communication system according to claim 6, in which each further station is arranged, in the event that, during the said path building procedure, it has assumed the through non-fault mode, it does not receive, within a predetermined time, a signal from the first station indicating that communication around the path has been established, to resume its looped mode and to communicate this fact to the first station, and the first station is arranged in response to such information from any station other than the station immediately adjacent thereto and other than the station to which transmission was first made, to cause its routing means to assume the through fault mode in which signals received on each channel are forwarded in the same channel, and if necessary to continue the path building procedure.

9. A communication system according to claim 6, in which the first station is operable when so instructed to carry out the said path building procedure only up to a specified further station and to cause its routing means to assume the through fault mode in which signals received on each channel are forwarded in the same channel and to continue the path-building procedure in the opposite direction only up to another specified station.

10. A communication system according to claim 6, including an additional first station, the system being operable to carry out a transmission path building producure in which the further first station transmits signal on one channel and, upon receipt of returned signal from the additional station via the other channel transmits a command thereto to cause its routing means to assume its through mode.

11. A communication system according to claim 10, including means arranged to recognise attempts by both first stations to establish overlapping transmission paths and upon such recognition to suppress execution of the path building procedure by all but one of such first stations.

12. A communication system according to claim 11, in which each first station is arranged to carry out the said path building procedure, in the event either of failure of the other first station previously active or of establishment by the other first station of communication on a transmission path not contianing the first station in question.

13. A communication system according to claim 12, in which the first stations recognise the said failure of the other first station as a result of communication failure having persisted for a predetermined length of time, such times being different for different ones of the first stations.

14. A communication system according to claim 6, in which the first station is arranged to carry out the path building procedure alternately in two directions round the loop.

15. A communication system according to claim 6, in which the routing means of each further station is arranged initally to assume a double-looped mode and automatically in response to receipt of a signal to remove the looped connection on the side thereof on which the signal has been received while remaining looped at the side thereof on which the signal has not been received.

16. A communication system according to claim 1, in which each station includes switching means remotely controlled to select that one of the channels with which the station communicates for transmission and/or reception when the channel is in its through, non-fault mode.

17. A communication system according to claim 1, including a plurality of access units connected to the communication channels for plug-in connection of said stations, each access unit comprising switching means serving in a first state to connect the incoming channels to the outgoing channels and in a second state to connect the incoming channels to the input of a plugged-in station and the output of the station to the outgoing channels, the switching means having a control input responsive to an enabling signal produced by the plugged-in station to assume the second state and to failure of the station to produce the enabling signal to physical disconnection of the station from the unit to assume the second state.

* * * * *